Patented Jan. 21, 1930

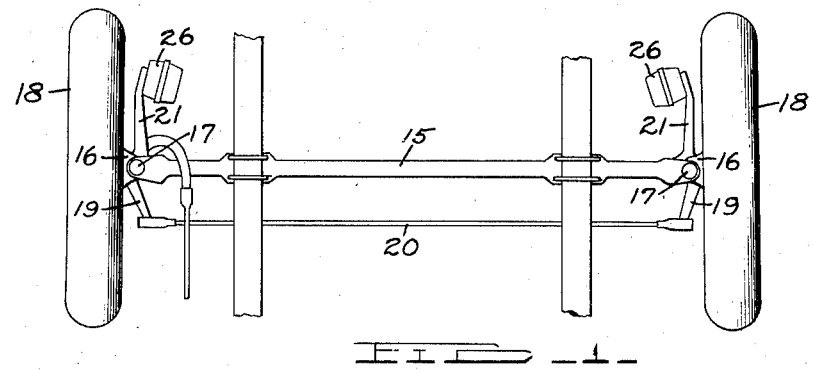
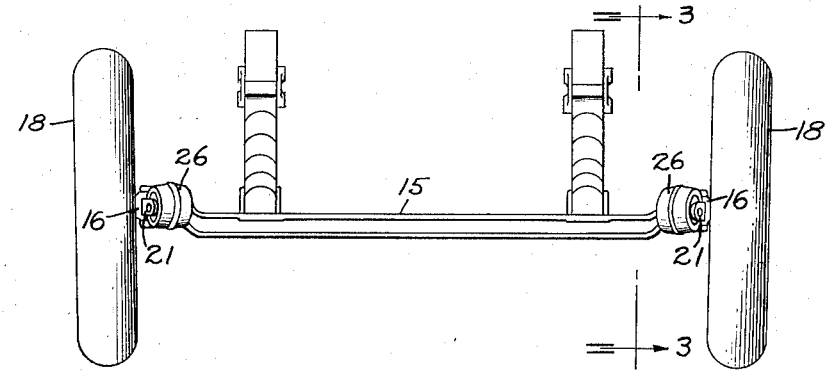
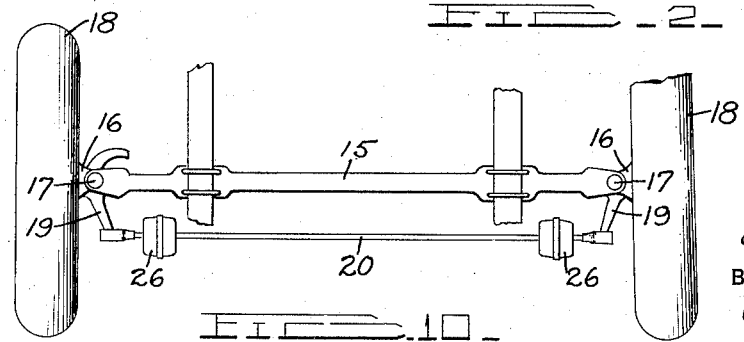

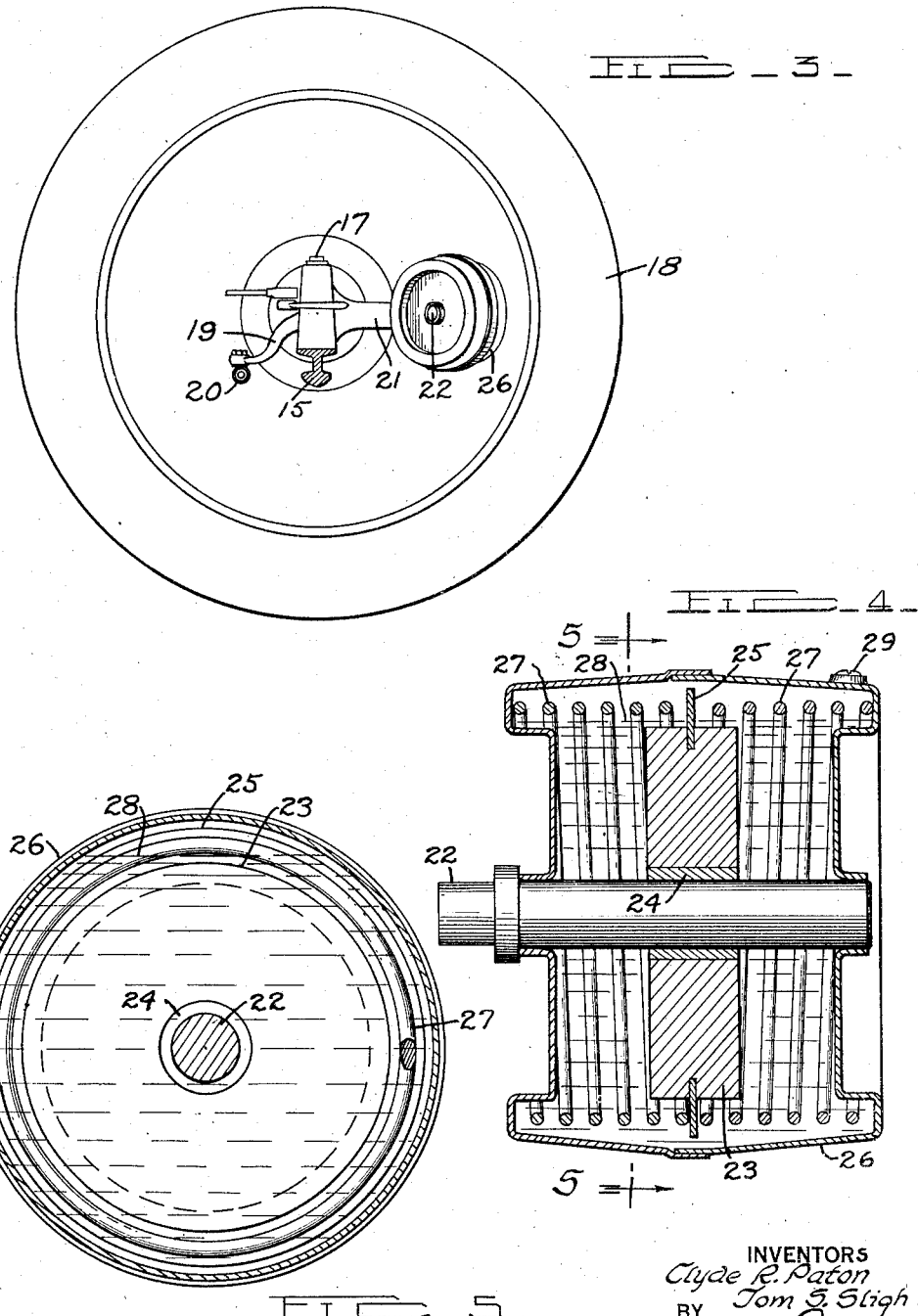

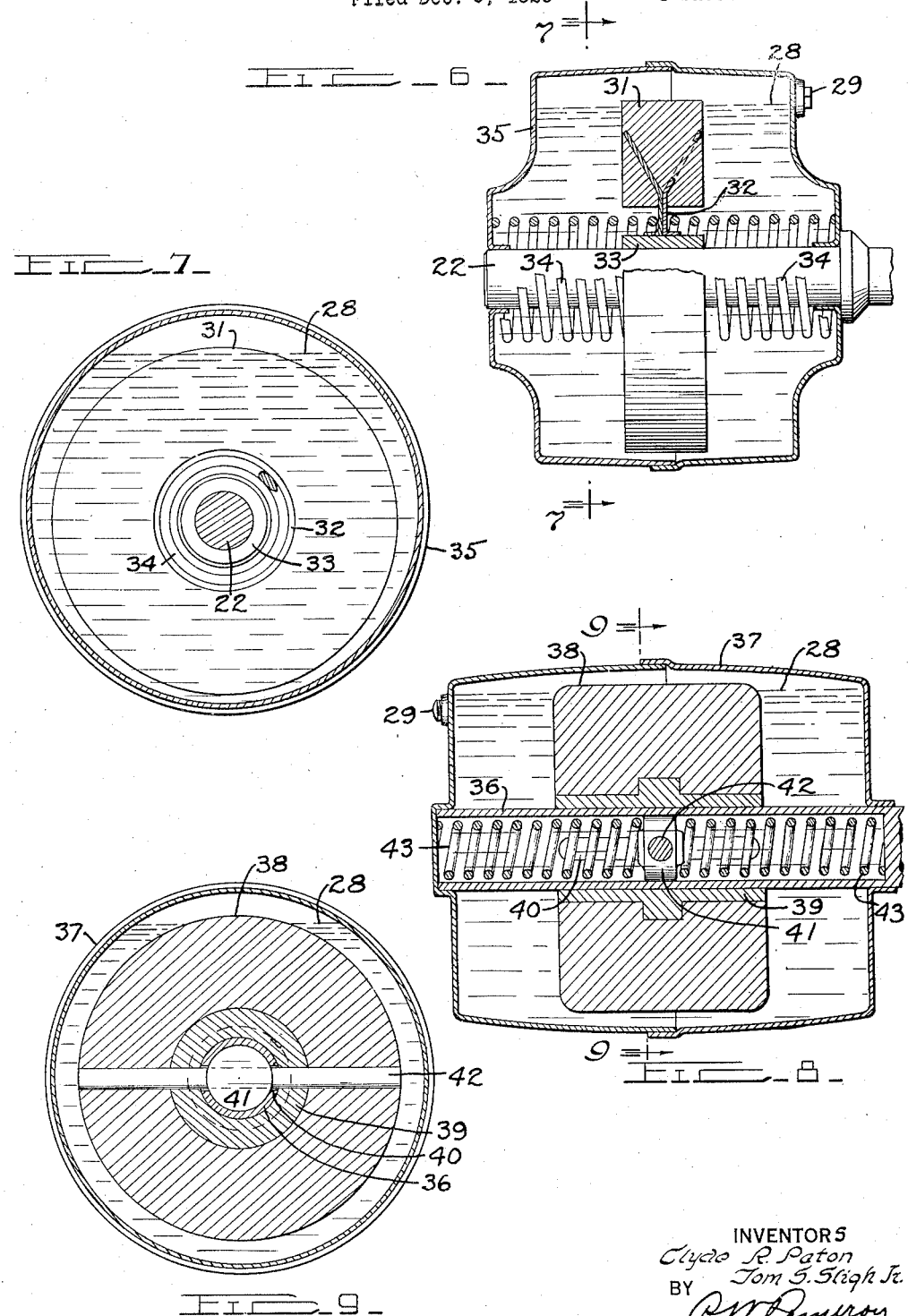

1,744,332

UNITED STATES PATENT OFFICE

CLYDE R. PATON AND TOM S. SLIGH, JR., OF SOUTH BEND, INDIANA, ASSIGNORS TO THE STUDEBAKER CORPORATION, OF SOUTH BEND, INDIANA, A CORPORATION OF NEW JERSEY

AUTOMOBILE CONSTRUCTION

Application filed December 6, 1926. Serial No. 152,873.

This invention relates to automobile construction, and deals particularly with those violent vibratory movements of parts thereof commonly known as "shimmy", the principal object being the provision of a device for developing forces in opposition to the forces tending to cause shimmy and thereby eliminating the effects thereof.

Another object is to provide a means for taking up the energy tending to cause shimmying of parts of an automobile and dissipating the same whereby the effect thereof is substantially overcome.

Another object is to provide, in combination with those parts of an automobile subject to shimmy, a secondary vibrating system for absorbing energy from the shimmying parts and dissipating the same, whereby to eliminate the deleterious effects thereof.

Another object is to provide, in combination with those parts of an automobile subject to those vibratory movements known as shimmy, a secondary vibratory system having a natural period of vibration such that it will take up energy from said parts and will dissipate the same, whereby shimmying of said parts will be opposed.

Another object is to provide, in combination with those parts of an automobile subject to shimmy, a spring-controlled mass having a suitable natural period of vibration, mounted to be affected by said shimmy, whereby the mass will absorb energy from said parts and will be caused to vibrate, means being provided for dissipating the energy so absorbed.

Another object is to provide, in combination with a part of an automobile subject to shimmying movement, a spring-controlled mass movable with respect to such part and having a natural period of vibration bearing a suitable relation to the period of vibration of such part, whereby the energy in such part due to its shimmying movement will be converted into a vibratory movement of said mass, and means being provided for frictionally resisting the vibratory movement of said mass in a degree increasing with the amplitude of vibration of said mass.

Another object is to provide, in combination with those parts of an automobile subject to shimmy, a spring-controlled mass having a suitable natural period of vibration, mounted to be affected by said shimmy, whereby the mass will absorb energy from said parts and will be caused to vibrate, said mass being enclosed in a container or casing containing a liquid whereby vibration of said mass will be frictionally opposed by said liquid in a degree increasing with the amplitude of vibration of said mass.

A further object is to provide in combination with those parts of an automobile subject to shimmy, a support positioned to be directly affected by the shimmying movement of said parts, a spring-controlled mass having a natural period of vibration approximating the period of shimmy vibration of said parts or a harmonic thereof being slidably supported thereon so as to be set in sympathetic vibration with said shimmy movement, said mass being surrounded by a casing secured against movement to said support, and said casing containing a liquid and being so shaped as to cause said liquid to frictionally resist vibratory movement of said mass in a degree increasing with the amplitude of vibration of said mass.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views, Figure 1 is a plan view of an automobile front axle, steering knuckles, wheels and cross tube, with a suitable embodiment of the present invention shown in connection therewith.

Figure 2 is a front elevation of Figure 1.

Figure 3 is a view taken on the line 3—3 of Figure 2.

Figure 4 is a sectional view taken centrally through and longitudinally of the damper device shown as part of the preceding views.

Figure 5 is a sectional view taken on the line 5—5 of Figure 4.

Figure 6 is a view similar to that shown in Figure 4, but of a modified construction.

Figure 7 is a section taken on the line 7—7 of Figure 6.

Figure 8 is a sectional view similar to the devices shown in Figure 4 and Figure 6, of another modified construction.

Figure 9 is a sectional view taken on the line 9—9 of Figure 8.

Figure 10 (sheet 1) is a view similar to Figure 1, and illustrating another method of mounting the damping mechanism embodying the present invention.

Those violent vibratory movements of the steering mechanism of automobiles commonly known as "shimmy" have, since the advent of the so-called "low pressure" or "balloon" tires in the motor vehicle industry, assumed proportions of great concern, and much time and energy have been spent in attempting to eliminate the same or the effects thereof. Various and widely different theories have been advanced as to the causes of shimmy and remedies suggested, and while some such remedies have been more or less successful in respect to certain constructions and conditions, they have not, to our knowledge, presented a satisfactory cure for the cause. Some have attempted to eliminate shimmy by the application of friction devices applied to directly resist movement of the shimmying parts, which is witnessed by those constructions employing frictional joints between parts moving relative to each other, such as at the point of connection of the cross tube with the steering knuckle arm, and such as the use of conventional type shock absorbers between the front axle and cross tube. Such devices, while materially reducing the shimmy, increase the effort required to steer the automobile, and thus directly destroy the advantages of easy steering which all automobile manufacturers attempt to include in their product and which is far more desirable, with low pressure tires than ever before.

With these problems in mind we have provided a construction which, although it does not remove the cause of shimmy, removes the effect thereof to such an extent that it substantially eliminates the same, and does eliminate it as far as all practical results are concerned, without affecting the ease of steering in any manner whatsoever. In doing this we consider those parts whose motion constitutes the shimmying movement as a primary vibrating system having a period of vibration equal to the number of oscillations of those parts in a given interval of time. We then provide a secondary vibratory system carried by or so connected to such parts as to be affected thereby, and having a natural frequency of vibration substantially the same, or slightly lower, than the period of vibration of the primary system, or of a harmonic thereof. The result is that upon vibration or shimmying of the primary system, the secondary system is caused to vibrate in sympathy therewith, and absorbs energy from the primary system. Means are provided for frictionally resisting this sympathetic vibration of the secondary system whereby such energy is dissipated, with the result that the energy tending to cause shimmy of the primary system is dissipated and substantially no shimmy occurs.

We have found that the forces tending to cause shimmying are relatively small when the first tendency to shimmy occurs, but that these forces rapidly build up, if unchecked, to a point where the shimmy is apparent and at times builds up to such an extent as to cause exceedingly violent movements of the whole automobile. We have also found that if these forces are checked in their incipient stages they are prevented from building up to a point where their effect as a shimmy is apparent. For that reason we find that the amount of energy necessary to be dissipated to prevent the forces tending to cause shimmying from building up is exceedingly small, and that the frictional resistance offered to the movement of the secondary mass need be very slight to attain the necessary result.

In case, however, the secondary system is capable only of very limited capacity for dissipating the energy absorbed thereby, and the forces tending to cause shimmy build up to a point beyond the energy dissipating limit of the secondary system, it will be evident that the effect of the secondary system would be avoided. To prevent such an occurrence we so design the secondary system that when it is first called into play and the forces tending to cause shimmy have not built up to a serious extent, the frictional resistance offered to the vibration of the vibratory mass of the secondary system is relatively slight, but when the forces tending to cause shimmy build up to a greater extent and cause a greater amplitude of vibration of the shimmying parts, which likewise causes a greater amplitude of vibration of the secondary vibratory mass, the frictional resistance to the vibration of the secondary mass is materially increased, thus increasing the ability of the secondary system to dissipate the energy absorbed. The design may be so controlled that any amount of energy absorbed by the secondary system may be absorbed, and may be such that the ability to dissipate such energy increases more rapidly than the corresponding increase of amplitude of vibration of the secondary vibratory mass. The particular method of accomplishing this will be apparent in the following description.

In Figure 1 is shown, in plan view, an automobile front axle 15 the ends of which pivotally carry the steering knuckles 16 by the king pins 17 in a conventional manner. Wheels 18 are rotatably carried by the knuckles 16 and each knuckle 16 is provided with a rearwardly extending arm 19, the arms 19 being joined for related movement by the conventional cross tube 20 pivotally connected thereto. These are the main parts of an automobile which shimmy and which for ease of description may be considered as the primary vibratory system referred to in the particular embodiment described, although other parts may properly be included, and parts affected by the movement thereof, but not properly a part of the system, excluded. These parts when shimmying have substantially a constant period of vibration, the movement of the cross tube 20 being primarily in the direction of its length, and the steering knuckles and wheels a relative rotary movement about the king pins 17.

The secondary vibratory system, which we prefer to call the dampers, are shown in Figures 1, 2 and 3 as being carried on arms 21 secured to and projecting forwardly from the steering knuckles 16 and are movable in direct relation to the movement of the steering knuckles 16. Each damper, as shown in Figures 4 and 5, comprises a supporting shaft 22 which is secured at one end to the free end of its corresponding supporting arm 21 by riveting or otherwise, and is preferably positioned so that its axis is substantially perpendicular to a line drawn through its center from the adjacent king pin 17. In other words, the axis of the shaft 22 is tangential to a circle with its center at the corresponding king pin 17. Slidably supported on the shaft 22 is a weight or mass 23 provided with a central bushing 24 and a centrally disposed outwardly projecting peripheral flange member 25 cast into or otherwise secured thereto. Surrounding the mass 23 and freely spaced from the ends thereof is a casing 26 composed of a pair of like cup-shaped stampings secured together in opposed relationship, and secured to the shaft 22 at their centers to form a liquid tight joint. The sides of the casing 26 as shown, are slightly spaced from the periphery of the flange member 25 so as to permit the mass 23 to slide freely on the shaft 22 within the casing, this clearance controlling the damping action on the mass 23 as will be presently described. Positioned on each side of the mass 23 and held between the corresponding end of the casing 26 and the peripheral flange member 25 in partly compressed state is a coil spring 27. These springs 27 normally hold the mass 23 centrally with respect to the ends of the casing 26 and are so proportioned that the natural period of vibration of the mass 23 along the support 22 is approximately the same as the period of shimmy vibration of those parts constituting the primary system, or a harmonic thereof, so that when such parts shimmy the mass 23 is caused to vibrate in sympathy therewith and caused to absorb energy therefrom as previously explained. In order to dissipate the energy thus absorbed by the mass 23 and thereby prevent the forces tending to cause shimmy from building up to a noticeable or objectionable degree, a liquid 28, preferably of a type not affected by temperature changes such as kerosene, is introduced into the casing 26 through an opening closed by the plug 29 (see Figure 4). The amount of such liquid 28 introduced into the casing 26 may be varied to suit conditions as will be presently explained, but as shown in Figures 4 and 5 is introduced up to the level indicated in the drawings. The purpose of this liquid 28 is to frictionally dampen or resist the vibratory movement of the mass 23 and thereby dissipate the energy therein. By the construction shown and with the liquid level shown this frictional resistance will be relatively small for small amplitudes of vibration of the mass 23, but will build up quickly with an increase of amplitude of vibration of the mass 23, and its capacity for dissipating the energy absorbed by the mass 23 from the primary system will increase accordingly.

This will be apparent if it is supposed that the mass 23 is vibrating with a relatively small amplitude. In such case the mass 23 will tend to move the liquid 28 on each side of it, but if this movement is not sufficient to displace an amount of liquid equal to the volume of the air in each side of the casing 26, the effect will be primarily a rocking of the liquid on each side of the mass 23, although a certain amount of the liquid will be forced from one side of the mass 23 to the other side and will thus exert a small frictional resistance to such movement of the mass 23. However, if the amplitude of vibration of the mass 23 is sufficiently great to displace an amount of liquid greater than such air then all of such liquid in excess of the volume of the air will be forced from one side of the mass 23 to its other side through the clearance between the periphery of the flange member 25 and the side of the casing 26, and the friction offered to thus forcing the liquid through this clearance will dissipate the energy in the mass 23. Moreover, as this clearance decreases from the center of the casing 26 toward its ends, the friction thus offered to force the liquid therethrough will increase as the amplitude of vibration of the mass 23 increases.

The practical result of the construction is that as soon as those parts constituting the primary vibratory system begin to vibrate, the mass 23 is caused to vibrate in sympathy therewith and in opposite phase thereto and absorbs energy therefrom, the energy thus absorbed being dissipated by the frictional resistance which the liquid 28 offers to vibratory movement of the mass 23 in a degree corresponding to the amount of energy which is necessary to be dissipated in order to prevent shimmy vibration of the primary system from building up to an apparent or objectionable degree. It will be apparent that the resistance offered by the liquid to movement of the mass 23 may be controlled by the amount of air in the casing 26, and by the clearance between the periphery of the flange member 25 and the sides of the casing 26.

In Figures 6 and 7 a slightly modified construction is shown in which the vibratory mass is shown as a weight 31 of torus shape having a central stamped web portion 32 preferably cast thereinto and carrying the central bushing 33 which is slidably received on the shaft 22. Springs 34 encircling the shaft 22 are held in partially compressed state between the web 32 and the ends of the casing 35 which is similarly formed but of slightly different shape than the casing 26 previously described. The casing in this modification is positioned slightly eccentrically with respect to the shaft 22 so that there is greater clearance between the periphery of the mass 31 and the sides of the casing 35 at the top than at the bottom. This difference in clearance prevents the resistance to vibration of the mass 31 from building up as quickly as in the previous case where the corresponding clearance was constant on all sides of the mass.

In Figures 8 and 9 a still different modification is shown. In this case a shaft 36 is employed which is hollow for the length of its casing 37. The weight 38 in this case is provided with a central bushing 39 cast directly thereinto which is slidably received on the shaft 36. Two diametrically opposed slots 40 are provided in the shaft 36 centrally of the casing 37 and connect the interior with the exterior thereof. A block 41 is slidably received within the hollow interior of the shaft 36 and a pin 42 projects through both the weight and the block, securing the same to move in unison with each other. Springs 43 are positioned within the hollow interior of the shaft 36 on each side of the block 41 for the same purpose as the springs described in connection with the previously described constructions and the resulting action is substantially the same.

In Figure 10 is shown a construction in which the dampers are formed on the steering cross tube 20, and we have found that the same are very effective for the intended purpose in this position. It will be apparent, however, that the present invention is not limited to placing the dampers in the particular positions shown, but that they may be placed in any position desired on any of the shimmying parts of the primary system, or so connected up to any of such parts as to be affected by the shimmy movement thereof and still serve the purposes intended, and such is within the contemplation of the present invention.

Formal changes may be made in the specific embodiments of the invention described without departing from the spirit and substance of the broad invention, the scope of which is commensurate with the appended claims.

What we claim is:

1. Means for preventing the forces tending to cause shimmying of parts of an automobile from building up, comprising a support movable in a direct relation to said parts, a spring controlled-mass movably mounted on said support and having a natural period of vibration approximating the period of shimmy vibration of said parts or a harmonic thereof, a casing surrounding said mass freely spaced from the end and periphery thereof and secured against movement to said support, and a liquid contained in said casing adapted to be displaced upon movement of said mass.

2. In an automobile, in combination with those parts thereof subject to shimmying movement, a support constrained to move in direct relation with the movement of one of said parts, a mass slidably mounted on said support, spring means co-operating with said mass whereby said mass has a natural period of vibration along said support approximating the period of shimmy vibration of said parts or a harmonic thereof, a casing surrounding said mass and secured against movement to said support, said casing being slightly spaced from the outside surface of said mass and free from the ends thereof, and a liquid contained in said casing adapted to be displaced by movement of said mass.

3. In an automobile, in combination with those parts thereof subject to shimmying movement, a support movable in a direct relation to said parts, a vibratory mass positioned on said support to be affected by said shimmying movement and to be set in motion thereby, a casing surrounding said mass slightly spaced from the edges thereof and free from the ends thereof, a gas and a liquid in said casing, the proportion of said liquid and said gas being such that a relatively small movement of said mass will cause primarily a change in the level of said liquid on either side of said mass, and a relatively great movement of said mass will cause a relative displacement of said liquid with respect to the ends of said mass.

4. In an automobile, in combination with those parts thereof subject to shimmying movement, a support movable in a direct relation to said parts, a vibratory mass positioned on said support to be affected by said shimmying movement and to be set in motion thereby, a casing surrounding said mass, the clearance between said mass and said casing decreasing from the normal central position of said mass, and a liquid in said casing.

5. In an automobile, in combination with those parts thereof subject to shimmying movement, a support movable in a direct relation to said parts, a vibratory mass positioned on said support to be affected by said shimmying movement and to be set in motion thereby, a casing surrounding said mass and a liquid in said casing, said casing being shaped to cause an increased resistance to displacement of said liquid in respect to said mass upon increase of amplitude of movement of said mass.

Signed by us at South Bend, Indiana, this 4th day of December, 1926.

CLYDE R. PATON.
TOM S. SLIGH, Jr.